(12) United States Patent
Stege

(10) Patent No.: US 9,617,973 B2
(45) Date of Patent: Apr. 11, 2017

(54) WIND TURBINE ROTOR BLADE

(71) Applicant: Jason Stege, Brande (DK)

(72) Inventor: Jason Stege, Brande (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 572 days.

(21) Appl. No.: 14/088,348

(22) Filed: Nov. 23, 2013

(65) Prior Publication Data

US 2014/0186189 A1     Jul. 3, 2014

(30) Foreign Application Priority Data

Dec. 27, 2012 (EP) ..................... 12199480

(51) Int. Cl.
*F03D 1/06* (2006.01)
*B29D 99/00* (2010.01)

(52) U.S. Cl.
CPC ....... *F03D 1/0675* (2013.01); *B29D 99/0025* (2013.01); *F05B 2230/23* (2013.01); *F05B 2230/60* (2013.01); *F05B 2240/302* (2013.01); *F05B 2240/57* (2013.01); *Y02E 10/721* (2013.01); *Y02P 70/523* (2015.11)

(58) Field of Classification Search
CPC .................... F03D 1/0675; B29D 99/0025
See application file for complete search history.

(56) References Cited

U.S. PATENT DOCUMENTS

| | | | | |
|---|---|---|---|---|
| 5,174,024 A * | 12/1992 | Sterrett | .................... | B64C 27/46 29/889.71 |
| 7,922,454 B1 * | 4/2011 | Riddell | ................... | F03D 1/001 416/224 |
| 8,702,396 B2 * | 4/2014 | Jo | ........................... | F03B 3/126 416/204 R |
| 2007/0253824 A1 * | 11/2007 | Eyb | ....................... | F03D 1/0675 416/223 R |
| 2009/0155084 A1 * | 6/2009 | Livingston | .............. | B29C 65/54 416/223 R |
| 2012/0114497 A1 * | 5/2012 | Petersen | ............... | F03D 1/0675 416/241 R |

FOREIGN PATENT DOCUMENTS

| | | | | | |
|---|---|---|---|---|---|
| EP | | 2264310 | A2 | 12/2010 | |
| EP | | 2365212 | A1 | 9/2011 | |
| KR | WO 2012005413 | A1 * | 1/2012 | ............. | F03B 3/126 |
| WO | | 2011098785 | A2 | 8/2011 | |

* cited by examiner

*Primary Examiner* — Craig Kim
*Assistant Examiner* — Juan G Flores
(74) *Attorney, Agent, or Firm* — Beusse Wolter Sanks & Maire

(57) ABSTRACT

A wind turbine rotor blade is provided. The wind turbine rotor blade includes at least two blade sections and a connector for connecting adjacent blade sections, which connector has an inner connecting part of a first blade section and an outer connecting part of a second blade section, wherein the outer connecting part is adapted to enclose the inner connecting part; and a first seal arranged about a connecting part such that an outer surface of the inner connecting part, an inner surface of the outer connecting part, and the first seal form a mold; and an adhesive layer introduced to fill the mold. A wind turbine having a number of such rotor blades as well as a method of constructing such a wind turbine rotor blade are also provided.

4 Claims, 6 Drawing Sheets

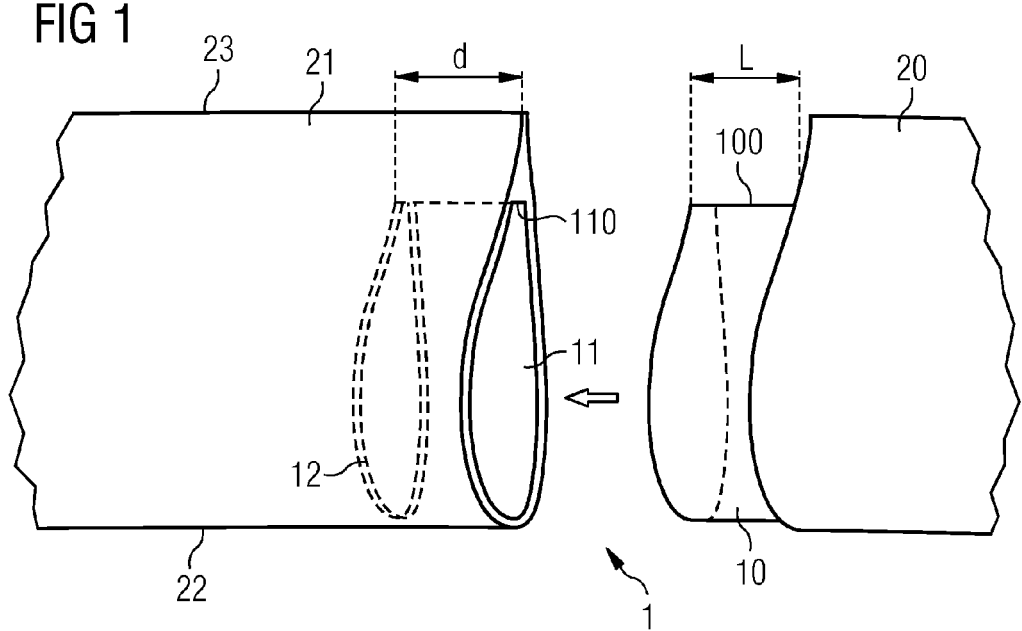
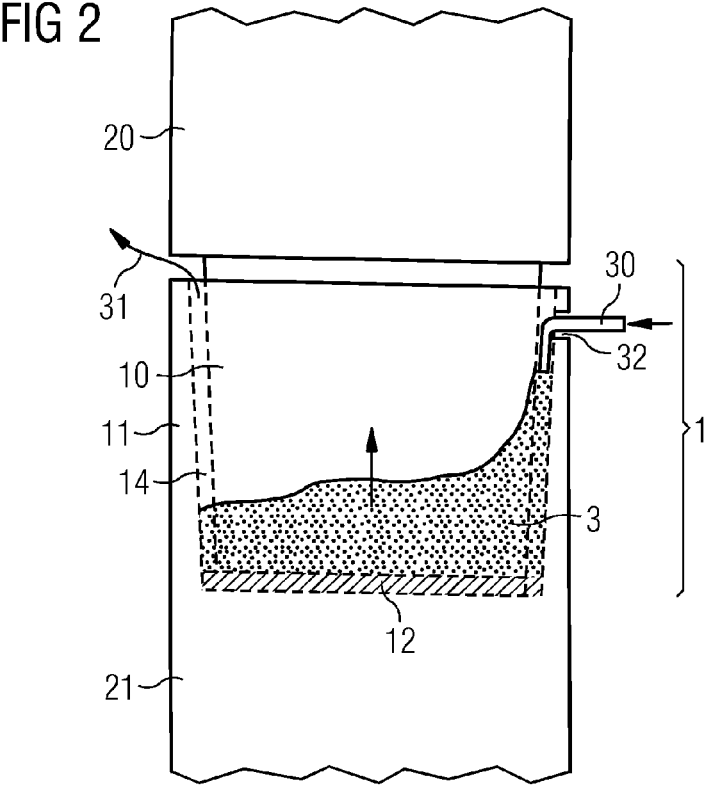

WIND TURBINE ROTOR BLADE

CROSS REFERENCE TO RELATED APPLICATIONS

This application claims the benefit of European Application No. EP 12199480.0 filed Dec. 27, 2012, incorporated by reference herein in its entirety.

FIELD OF INVENTION

The invention describes a wind turbine rotor blade, a wind turbine, and a method of constructing a wind turbine rotor blade.

BACKGROUND

Rotor blades for large wind turbines may reach lengths of 80 m or more. The manufacture of such a long rotor blade in one piece is generally not feasible. Furthermore, the transport of a very long rotor blade to a destination such as a wind turbine site can be very problematic and adds considerably to the overall cost of a wind turbine. Therefore, long wind turbine rotor blades may be assembled by connecting rotor blade sections together. A rotor blade section can be manufactured in a more straightforward manner, and the transport of such sections is relatively economical. Since the outer surface of a rotor blade should be as smooth as possible to ensure a favorable aerodynamic performance, any interface elements used to join adjacent rotor blade sections must be arranged in the interiors of the blade sections. These interface elements can be connected together a number of ways. However, the connections between adjacent rotor blade sections are associated with a number of problems.

In one approach, the interface elements are embodied as a slip fitting, i.e. the interface element of one blade section slips into a corresponding interface element of the neighboring blade section, and a high-viscosity adhesive is used to bond the interface sections together. The adhesive must have a high viscosity to ensure that it remains only between the interface elements and that it does not "escape" or spread into interior regions of rotor blade before it hardens. However, air pockets are often trapped in such a high-viscosity adhesive, and these air pockets remain after hardening or curing. The air pockets reduce the effectiveness of the adhesive bond between the interface elements, so that the rotor blade sections can detach. Furthermore, moisture can enter an air pocket and attract a lightning strike to the slip connector, thereby bypassing a lightning conductor of the rotor blade.

To circumvent the inclusion of air pockets, another approach considers bonding the interface elements with a low-viscosity resin. A vacuum infusion process is set up to draw the low-viscosity resin through the interface elements. However, a vacuum infusion process is costly and complex, and must be adapted specifically to each interface shape. For rotor blades comprising three or more sections, the assembly procedure can be prohibitively expensive and time-consuming.

SUMMARY OF THE INVENTION

It is therefore an object of the invention to provide an improved way of connecting rotor blade segments that avoids the problems described above.

This object is achieved by the rotor blade of claim 1; by the wind turbine of claim 11; and by the method of claim 12 of constructing a wind turbine rotor blade.

According to the invention, the wind turbine rotor blade comprises at least two blade sections and a connector for connecting adjacent blade sections, which connector comprises an inner connecting part of a first blade section and an outer connecting part of a second blade section, wherein the outer connecting part is adapted to enclose the inner connecting part; a first seal arranged about a connecting part such that an outer surface of the inner connecting part, an inner surface of the outer connecting part and the first seal form a mould; and an adhesive layer introduced to fill the mould.

The "mould" is given by the first seal and the opposing surfaces of the inner and outer connecting parts. An advantage of the wind turbine rotor blade according to the invention is that the mould effectively prevents any adhesive from escaping before it has the opportunity to harden, so that the adhesive used to bond the blade sections together need not be a high-viscosity adhesive. Therefore, a low-viscosity adhesive can be introduced into this space to fill the mould. The mould contains the adhesive without danger of its escaping, and the adhesive can harden gradually. A low-viscosity adhesive will fill the space defined by the mould without the inclusion of air pockets, since any air in the space between the opposing surfaces of the inner and outer connecting parts will simply be expelled as the adhesive flows to fill that space.

According to the invention, the method of constructing a wind turbine rotor blade comprises the steps of forming a first blade section to include an inner connecting part of a blade connector; forming a second blade section to include an outer connecting part of the blade connector such that the outer connecting part is adapted to enclose the inner connecting part; arranging a first seal about a connecting part; arranging the outer connecting part about the inner connecting part such that an outer surface of the inner connecting part, an inner surface of the outer connecting part and the first seal form a mould; and introducing an adhesive layer to fill the mould.

It should be understood that the outer connecting part and the inner connecting part do not fit tightly together initially. Instead, the outer connecting part fits "loosely" about some or all of the inner connecting part, i.e. a gap remains at least over some of the area of overlap between the connecting parts. The form of the resulting adhesive layer contained by the "mould" is governed by the gap dimensions. An advantage of the method according to the invention is that the connector can be constructed or embodied in a fairly simple and straightforward manner, while achieving a robust and reliable adhesive join between the rotor blade sections. Since the mould will contain the adhesive as it hardens, any suitable low-viscosity adhesive could be used, with the advantage that the inclusion of air pockets in the hardened adhesive is essentially prevented. Any air in the mould formed by the connecting parts and the first seal can simply escape as the adhesive fills the mould.

Particularly advantageous embodiments and features of the invention are given by the dependent claims, as revealed in the following description. Features of different claim categories may be combined as appropriate to give further embodiments not described herein.

Generally, the inner connecting part extends outward to a certain length from a blade section, while a corresponding outer connecting part extends inward into the adjacent blade section to essentially the same length. In this way, a favorably stable connector can be formed.

Preferably, the inner connecting part of a blade section extends in the direction of a tip of the rotor blade, while an outer connecting part of a blade section extends in the direction of a root end of the rotor blade. This arrangement has a number of advantages. For example, an outer tip blade section can generally be quite flat and therefore relatively fragile. An embodiment in which the connecting part of such a flat blade section extends into the blade section is structurally more robust compared to a connecting part that would protrude from it, especially since such a protruding connecting part must be thinner than the blade section itself.

The connecting parts of an interface between adjacent blade sections may be shaped in any suitable way. For example, the inner and outer connecting parts may be formed as two nested cylinders, or any suitable polygonal shape. However, when external forces act on the rotor blade, loads will be transferred from one blade section to the adjacent blade section. Here, it is favorable to transfer the load as completely as possible by ensuring a minimum degree of freedom between the adjacent blade sections. Therefore, in a particularly preferred embodiment of the invention, the shape of a connecting part "follows" the shape of its blade section or is derived from the shape of its blade section. Since a rotor blade has an airfoil shape similar to a teardrop or leaf in cross-section, the shapes of the inner and outer connecting parts may also be essentially teardrop-shaped or leaf-shaped. By forming the connecting parts in this way, the degree of freedom between adjacent blade sections is essentially minimized, so that the blade sections will retain their alignment along a longitudinal axis of the rotor blade.

The connecting parts can follow the airfoil shape quite closely. However, in a particularly preferred embodiment of the invention, each connecting part comprises a blunt face essentially perpendicular to a chord line of its rotor blade section. When both connecting parts have corresponding blunt faces, an additional structural stability is given when these blunt faces are bonded by adhesive.

The blunt face can be formed at any suitable region of a connecting part. However, a rotor blade may have a relatively flat airfoil portion over some of its length, with a thin "trailing edge" to optimize its aerodynamic performance. It may be time-consuming or difficult to form a correspondingly shaped thin region on a connecting part, especially since the cross-section of a connecting part is smaller than the cross-section of the rotor blade containing it. Therefore, in a further preferred embodiment of the invention, the blunt face is arranged towards the trailing edge of the blade section. Instead of forming a thin "trailing edge" portion of a connecting part, therefore, the connecting part is simply truncated.

As mentioned above, a low-viscosity adhesive can be used to fill the mould formed by the connecting parts and the first seal. In a further preferred embodiment of the invention, the step of introducing such a liquid or low-viscosity adhesive to fill the mould is performed by pouring the adhesive into a gap between the outer connecting part and the inner connecting part. The liquid adhesive can be introduced into the gap or mould by using a suitable nozzle or tube inserted into the space between inner and outer connecting parts. Equally, such a nozzle or tube could be inserted through a hole drilled through the outer connecting part. Such a hole can be sealed once the nozzle is removed after filling the mould with adhesive.

The strength of an adhesive may be directly proportional to its viscosity. However, the favorably strong connection obtainable with a high-viscosity adhesive alone is outweighed by the instability and lightning strike risk resulting from air pockets trapped in such an adhesive layer. Therefore, in a further preferred embodiment of the invention, a combination of high-viscosity and low-viscosity adhesives can be used. For example, a high-viscosity adhesive can be injected into the mould at one, two or more points about the interface to "spot fill" the mould, deliberately leaving room between those "spots" of high-viscosity adhesive. In a subsequent step, a low-viscosity adhesive is allowed to flow into the mould, thereby flowing around these "spots" to fill the remaining cavity. In this way, the interface connection makes use of the advantages of both high- and low-viscosity adhesives.

Particularly when a low-viscosity adhesive is being used to fill the mould and make the connection between the blade sections, it is important to ensure that the liquid remains in the mould and does not "escape" into the blade section interiors. Therefore, a further preferred embodiment of the method according to the invention comprises a step of monitoring a pressure between the inner connecting part and the first seal while the outer connecting part is being arranged about the inner connecting part. Whether the inner connecting part is being pressed sufficiently against the first seal can be established by in a number of ways. In a relatively straightforward approach, the lengths of the inner and outer connecting parts are measured and recorded. The thickness of the seal and its position (relative to the connecting part about which it is arranged) is also recorded. When the blade sections are pushed together, a visual inspection of the connection can determine if the inner connecting part is making sufficiently good contact to the first seal. Alternatively, the blade sections can be pushed together to a first estimated position, and any gaps at the interface between blade sections can be temporarily sealed, leaving a port or valve in place for creating a vacuum in the mould. If the vacuum is maintained for a certain length of time, the connection can be judged to be satisfactory. The temporary seal can then be removed and the mould can be filled with adhesive. Instead of applying a vacuum or under-pressure, the quality of the first seal can be tested by applying an over-pressure. If air cannot be pumped into the mould, the first seal may be judged to be satisfactory.

The connector design according to the invention allows blades to be assembled directly at the wind turbine. For example, a blade root section can be mounted to the hub of the wind turbine generator already mounted on a tower. Successive blade sections can then be added using the method described above to complete the blade. To this end, some hoisting tackle can be foreseen at the hub for raising a blade section from ground level or from a supply ship at sea level. In such a mounting or assembly procedure, the blade being built up will generally be arranged to point directly downwards, since workers can most easily and safely access the blade in that position. In a particularly preferred embodiment of the invention, an inner connecting part of a blade section is arranged at the end of the blade section that is closer to the tip of the rotor blade (i.e. the inner connecting part points downward during mounting), while an outer connecting part of a blade section is arranged at the end of the blade section that is closer to the hub (i.e. the outer connecting part points upward during mounting). This arrangement allows a particularly straightforward assembly of a rotor blade directly at the wind turbine, since any liquid or low-viscosity adhesive can simply be poured into the mould. Gravity assists the adhesive to flow downward toward the first seal and to fill the mould, thereby expelling any air. Once the mould is filled with liquid adhesive, any remaining gap between first and second blade sections can be filed or sealed using a fast-curing adhesive or a wrap seal. The liquid adhesive is therefore effectively contained within the mould and can harden. The hoisting equipment can be used to suspend the blade section in place until the adhesive in the blade connector has hardened sufficiently. The spinner can then be rotated slowly by 120 so that the next rotor blade can be assembled by connecting sections as described above. Because the adhesive is completely sealed within the mould, there is no need to wait for it to harden completely before rotating the spinner. In this way, the time to assemble of the rotor blades can be reduced.

The first or inner seal can be secured or arranged in any suitable fashion relative to the outer connecting part of a blade section. For example, a line of polyurethane foam might be applied about the interior circumference of the blade section at the base of the portion forming the outer connecting part. Alternatively, a strip of rubber or other elastic material may be secured about the interior circumference of the blade section, here also along the base of the portion forming the outer connecting part. Such a strip can be glued in place about an inner surface of the second blade section at the base or inner end of the outer connecting part. A more favorable site for the first seal can be formed as a flange extending some distance into the interior of the second blade section. Such a flange can be formed relatively easily during a layup step in the shaping of a fiberglass rotor blade, for example prior to a vacuum moulding procedure.

The inner seal can be made of any suitable material, for example a material that is sufficiently flexible and deformable or soft, to press against the inner connecting part when this is pushed into the outer connecting part. In a preferred embodiment of the invention, the inner seal comprises a material such as a polyurethane material, a silicone caulk, a synthetic rubber, an elastic polymer, a fluid-filled O-ring, etc. The material or composition of the first seal is preferably chosen in consideration of any possible reaction with the adhesive to be used, and in consideration of the lifetime of the material under adverse temperature conditions.

Any residual gap between adjacent blade sections can be sealed using a second seal, which can be applied before or after hardening of the adhesive in the mould between the connecting parts. For example, a second seal can comprise a wrap seal formed by wrapping a leak-tight material tightly about the interface. However, as indicated above, the surface of a rotor blade should preferably be as smooth as possible. Therefore, preferably, the outer seal comprises a one-component sealant or a two-component sealant applied to fill any crack or gap between the adjacent blade sections. The second seal can be smoothed before curing, or may be sanded or otherwise smoothed after curing to obtain the desired smooth blade surface.

The inner and outer connecting parts can be formed to have essentially planar surfaces, i.e. following the form of their respective blade sections. However, especially for very long rotor blades, forces acting on the blades can cause these to bend. For a blade comprising several sections joined together, any connection that cannot withstand such forces can reduce the stability of the blade. For example, if the connecting parts are formed with simple planar surfaces, a very strong wind might bend the blade so far that the inner connecting part deforms and fails. Therefore, in a particularly preferred embodiment of the invention, a connecting part comprises at least one ridge or groove arranged in an essentially longitudinal direction, i.e. essentially parallel to a longitudinal axis of the blade section or rotor blade. Such ridges can increase the structural stability of the connector, since one or more longitudinal ridges on the inner connecting part can decrease the likelihood of its bending under load, while the adhesive filling such a ridge or groove can act as a strut within the connector, etc. To improve the stability of the connector even further, in a preferred embodiment of the invention the outer connecting part comprises a ridge arranged to match a longitudinal ridge of the inner connecting part. Such matching ridges can also act as a guide to facilitate the "mating" of the blade sections when the second blade section is slipped over the first blade section.

The stability of the connector can also be influenced by the length and thickness of the connecting parts. A favorable length of a connecting part will depend to a large extent on the length of the blade section. For example, a connecting part may be 1.0 m or more in length. The stability of the glued connector will be influenced by the thickness of a connecting part. A too thin connecting part may deform easily under loading, so that a rotor blade might ultimately crack and fail in the region of the blade connector. Therefore, in a preferred embodiment of the invention, the thickness of a connecting part comprises about 1% of the length of the connecting part. For example, an inner connecting part with a length of 100 cm is preferably about 10 mm in thickness, i.e. its average thickness may be 10 mm, taking into account the usual tolerances for the manufacturing technique(s) used to form the blade sections.

For a favorably stable rotor blade, the blade connector preferably does not adversely affect the blade's inherent flexibility, i.e. its ability to bend or deform slightly under load. Therefore, in a particularly preferred embodiment of the invention, the connecting parts are formed to taper or become gradually thinner towards their outer edges. For example, the inner connecting part may commence with a thickness of about 15 mm at the open face of the first blade section, tapering gradually over the length of the connecting part (e.g. 100 cm) to a thickness of only about 5 mm at its outer end. In the same way, the outer connecting part can taper from a similar initial thickness of about 15 mm (at the location of the first seal) to a thin outer edge of only about 5 mm. In this way, the thicker region of one connecting part meets the thinner region of the other connecting part. When joined by the adhesive layer in the "mould", the tapered edges ensure that there is no abrupt "step" that might otherwise result in the development of cracks in the rotor blade when subject to high loads.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

FIG. 1 is a schematic representation of a step in an embodiment of the method according to the invention;

FIG. 2 is a schematic representation of a further step in an embodiment of the method according to the invention;

In the diagrams, like numbers refer to like objects throughout. Objects in the diagrams are not necessarily drawn to scale.

DETAILED DESCRIPTION

Figure 3:
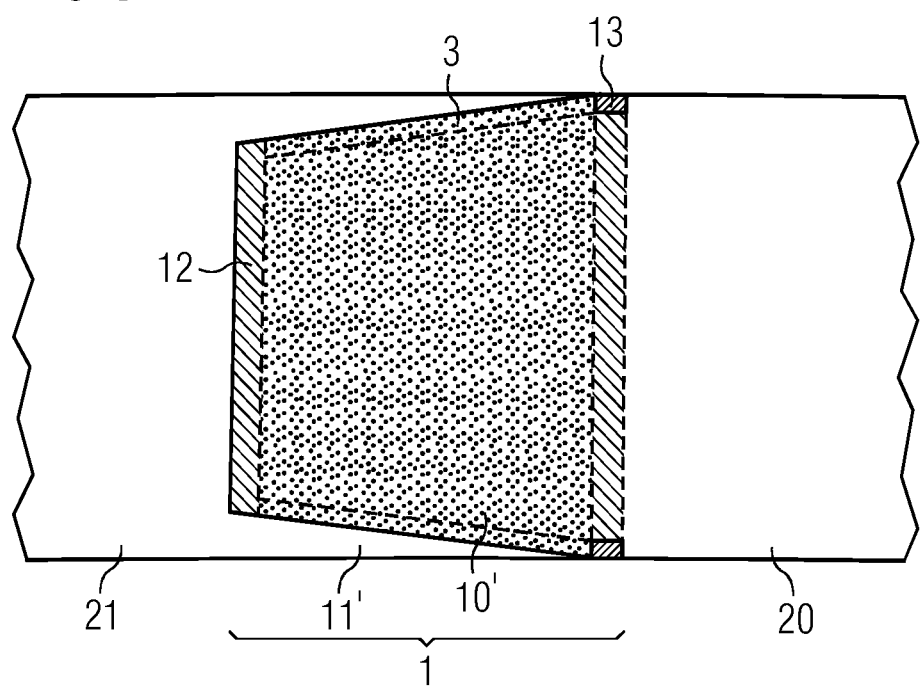
FIG. 3 shows a connector connecting adjacent blade sections in an embodiment of a wind turbine rotor blade according to the invention.

FIG. 1 is a schematic representation of a step in an embodiment of the method according to the invention, in which a first connecting part 10 of a first blade section 20 of a wind turbine rotor blade is being inserted into a second connecting part 11 of a second blade section 21. The first connecting part 10 effectively "mates" with the second connecting part 11, whereby the first and second connecting parts are dimensioned so that the inner connecting part 10 is somewhat smaller that the outer connecting part 11, so that a gap remains between inner and outer connecting parts 10, 11 when the blade sections are joined.

The shape of a connecting part 10, 11 follows the shape of the blade section 20, 21. Since it is generally desired that the blade sections 20, 21 meet in a smooth transition, the shapes of the inner and outer connecting parts 10, 11 are similar. Here, both connecting parts 10, 11 have an airfoil shape, since the blade sections 20, 21 also have an airfoil shape between a thicker leading edge 22 and a thin trailing edge 23. In this embodiment, each connecting part 10, 11 has a blunt face 100, 110 at the side nearest the trailing edge 23 of the blade, so that this portion of the connecting part 10, 11 can be manufactured with relatively little effort, while also adding stability to the connection.

A first seal 12 has previously been arranged in the interior of the second blade section 21 at a distance d from the open face of the second blade section 21 corresponding to a length L of the first connecting part 10. The length L, i.e. the amount by which the first connecting part 10 extends into the second blade section 21, may comprise a certain percentage of the blade span, and the average thickness of each connecting part can be about 1% of this length L.

In this embodiment, the first seal 12 is a strip or band of a suitable material secured to an inside wall of the second blade section 21. When the inner connecting part 10 is pushed into the outer connecting part 11, the outer edge of the inner connecting part 10 will press against the first seal 12. In this way, an impervious or leak-proof seal is formed between the inner and outer connecting parts 10, 11. Owing to the gap between the inner and outer connecting parts 10, 11, a mould is formed by the first seal 12 and the space between the inner and outer connecting parts 10, 11.

FIG. 2 shows a further step in the method according to the invention, in which the mould 14 of a blade connector 1 is filled by a liquid adhesive 3. The blade sections 20, 21 are shown to be held essentially vertically to facilitate the connection. Here, a low-viscosity adhesive 3 is being poured into the mould via an inlet 30. This can simply be a tube 30 or nozzle 30 inserted through a temporary opening drilled in the outer connecting part 11. The adhesive 3 flows downward, assisted by gravity, and the level of the adhesive 3 in the mould rises as indicated by the upward pointing arrow. The expelled air 31 may escape through a remaining narrow gap between blade sections 20, 21, or another temporary opening can be formed by drilling another hole near the top of the second blade section 21. Because of the low viscosity of the adhesive 3, air 31 can easily escape from the mould 14 and cannot become trapped by the adhesive 3. Once the adhesive 3 has filled the mould 14, the inlet 30 is removed and the adhesive 3 is allowed to harden or cure. Depending on the type of adhesive used, heat may be applied to facilitate the curing step. An adhesive such as a thermosetting polymer releases heat in an exothermic reaction, and this can be sufficient to cure the adhesive. If additional heat is required, hot air can be directed at the connector, or the entire area about the connector can be wrapped in a thermal cladding for the time it takes for the adhesive to cure, etc.

Once the mould 14 is filled with adhesive 3, the inlet 30 can be removed. Any opening 32 or other remaining gap between the blade sections 20, 21 can be sealed by a second seal. For example, a one- or two-component sealant can be pressed into the lateral gap between the lower end of the first blade section 20 and the upper end of the second blade section 21. In this diagram, a lateral gap between the lower end of the first blade section 20 and the upper end of the second blade section 21 is shown in an exaggerated manner. The blade sections 20, 21 and the connecting parts 10, 11 may be formed so that, when fitted together, essentially no gap remains.

FIG. 3 is a simplified rendering of a connector 1 connecting adjacent blade sections 20, 21 in another embodiment. Here, connecting parts 10', 11' of the blade sections 20, 21 are slanted. Again, a first seal 12 arranged inside the second blade part 21 forms a mould with the gap between the connecting parts 10', 11'. This gap has been filled by a low-viscosity adhesive 3. After curing, a second seal 13 has been applied between the first and second blade sections 20, 21 about the blade body, so that a favorably smooth transition is obtained between the blade sections 20, 21.

Figure 4:
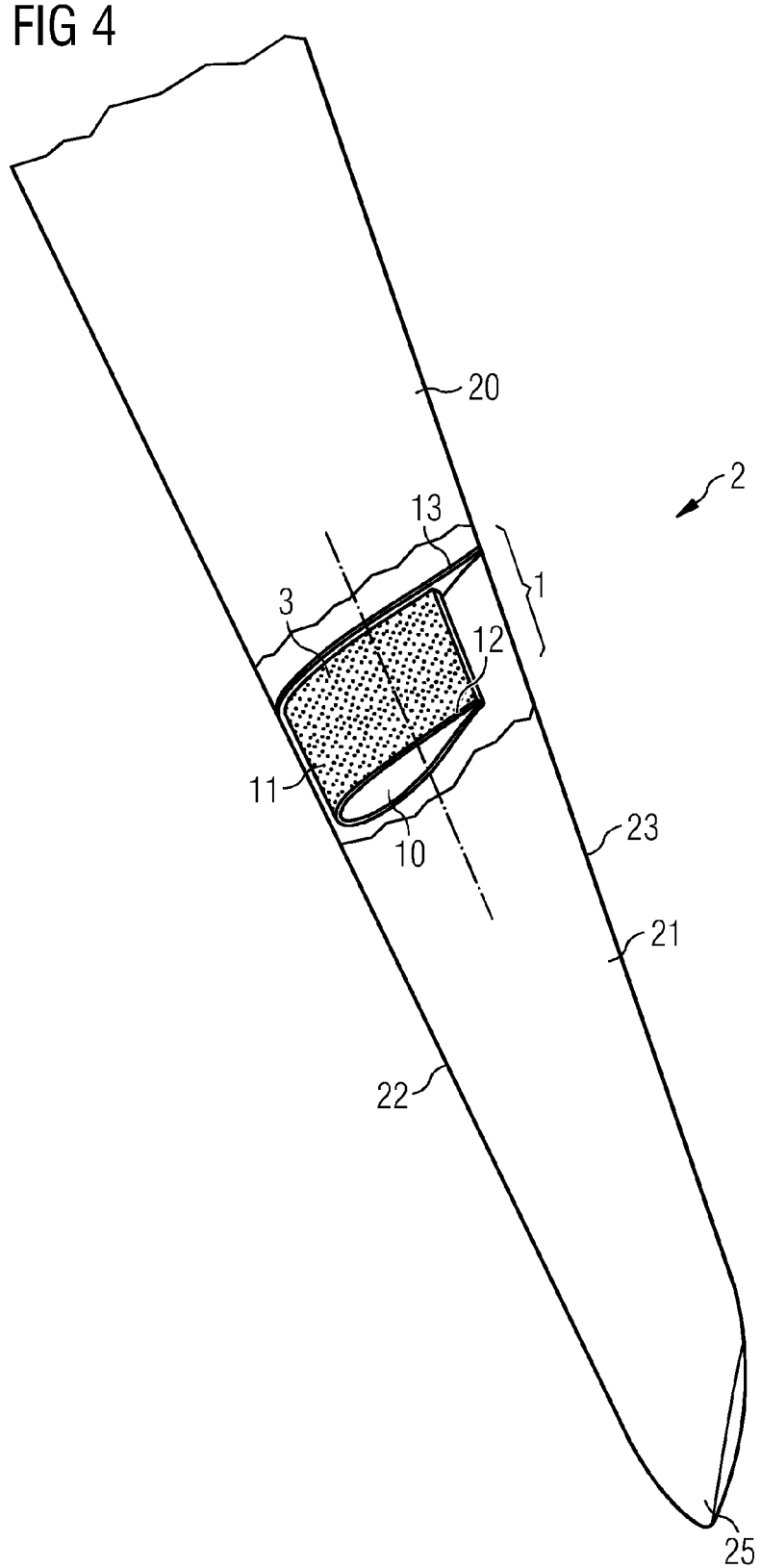
FIG. 4 shows an embodiment of a wind turbine rotor blade according to the invention.

FIG. 4 shows an embodiment of a wind turbine rotor blade 2 according to the invention. Here, the first blade section 20 is a main blade section 20, while the second blade section 21 is a tip portion of the blade 2. The diagram shows a connector 1 between these blade sections 20, 21. The first seal 12 between inner and outer connecting parts 10, 11 ensures that a low-viscosity adhesive 3 can be contained in the intermediate space between these connecting parts 10, 11. At the same time, a passage can extend between a cavity in the first blade section 20 and a cavity in the second blade section 21, so that, for example, a lightning conductor arrangement can extend between the blade sections 20, 21. The diagram shows that the outer connecting part 11 is arranged at the end of the blade section 21 directed towards the hub or blade root; while the inner connecting part 10 is arranged at the end of the blade section 20 directed towards the bade tip 25.

Figure 5:
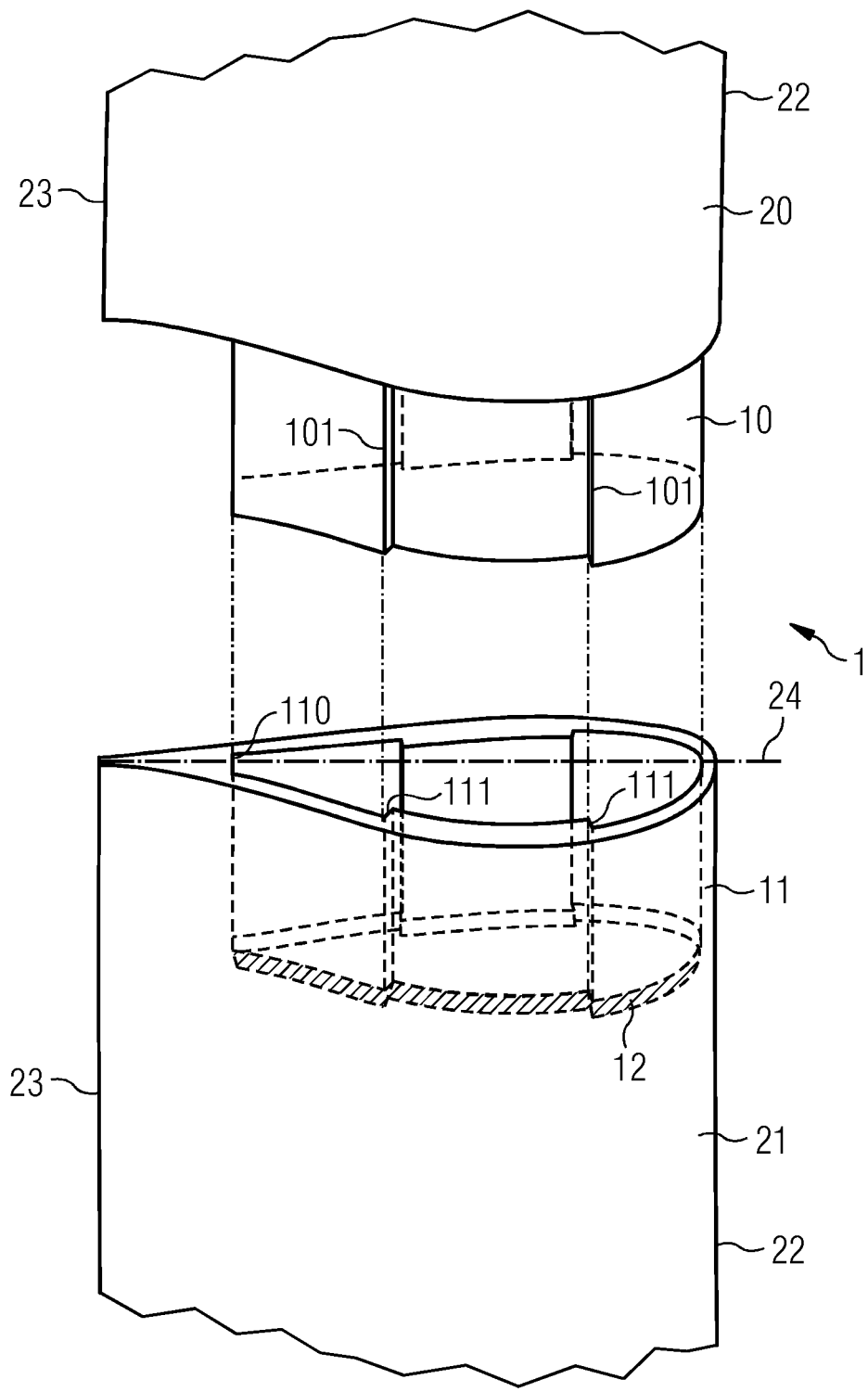
FIG. 5 shows a further embodiment of a connector according to the invention.

FIG. 5 shows an alternative embodiment of a connector. Here, the connecting parts 10, 11 are embodied with longitudinally extending ridges or steps 101, 111. A ridge 101 of the inner connecting part 10 matches the position and size of a ridge 111 of the outer connecting part 11. The ridges 101, 111 serve the purpose of guiding the inner connecting part 10 along the outer connecting part 11 during mating, while also adding to the structural strength of the connecting parts. Furthermore, the ridges 101, 111 act to prevent a displacement of one blade section relative to the other until the adhesive layer has hardened. This diagram also indicates a blade chord line 24, showing that the blunt face 110 of the outer connecting part 11 is essentially at right angles to the chord line 24 for a connector with a favorably high structural stability.

Figure 6:
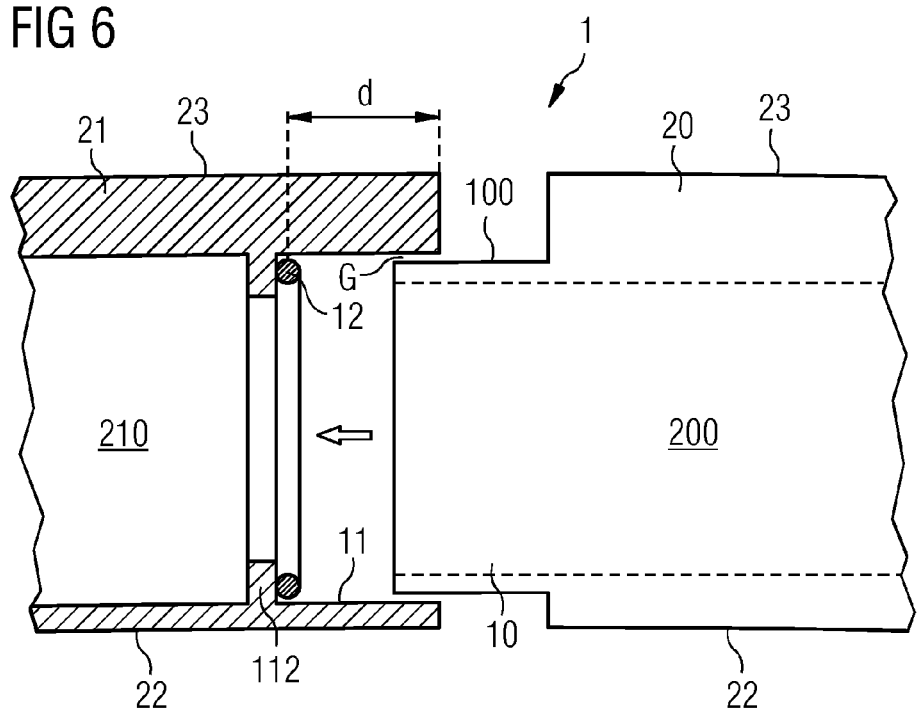
FIG. 6 shows a further embodiment of a connector according to the invention.

FIG. 6 shows a schematic representation of a further embodiment in which with a flange 112 is formed in the interior of the second blade section 21, at a distance d from the open end of the blade section 21 to correspond to a depth of a corresponding inner connecting part 10. The flange 112 can be constructed, for example, as part of a blade assembly prior to a vacuum extraction procedure in which the blade section 21 is moulded. The flange 112 can extend some distance into the interior of the blade section 21 so that a first seal 12 can be secured to the flange 112. The first seal 12 can be cut to shape from a sheet of synthetic rubber or similar material, and attached to the flange 112. Subsequently, the inner connecting part 10 of a first blade section 20 can be introduced into the outer connecting part 11 of the second blade section 21 as indicated by the arrow. The outer end of the inner connecting part 10 will push against the seal 12, and the seal 12 will ensure that no liquid adhesive can escape into the interiors 200, 210 of the blade sections 20, 21, and that the liquid adhesive is contained in a mould formed by the first seal 12 and opposing surfaces of the connecting parts 10, 11.

Figure 7:
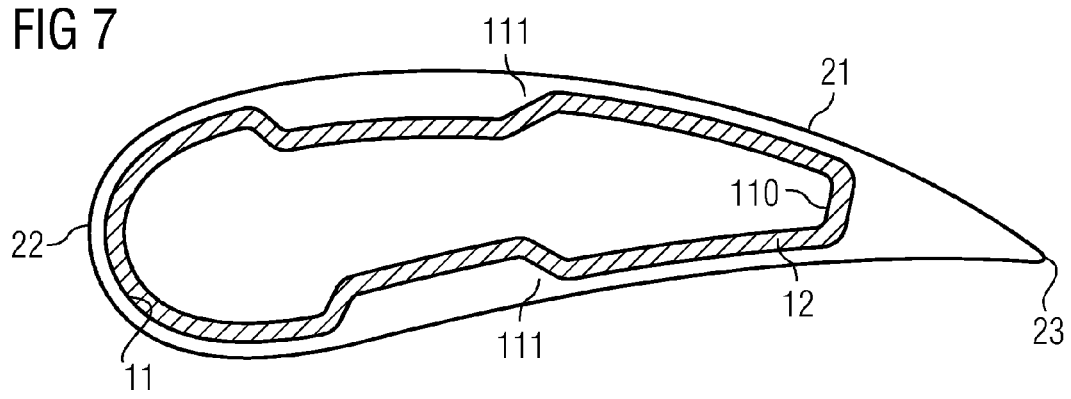
FIG. 7 shows a view into the interior of a second blade section of a further embodiment of the connector.

FIG. 7 shows a view into the interior of a second blade section 21. In this embodiment, two wide ridges 111 have been formed on opposing faces of the outer connecting part 11. These can match corresponding ridges on an inner connecting part (not shown). Looking into the blade section 21, a first seal 12 is shown to "line" the blade section 21. Of course, the first seal 12 is arranged at the depth of the inner connecting part, as explained in the preceding diagrams. The shape of the seal 12 follows the shape of the outer connecting part 11, so that it also has a "blunt" portion to match the blunt face 110 of the outer connecting part 11.

Figure 8:
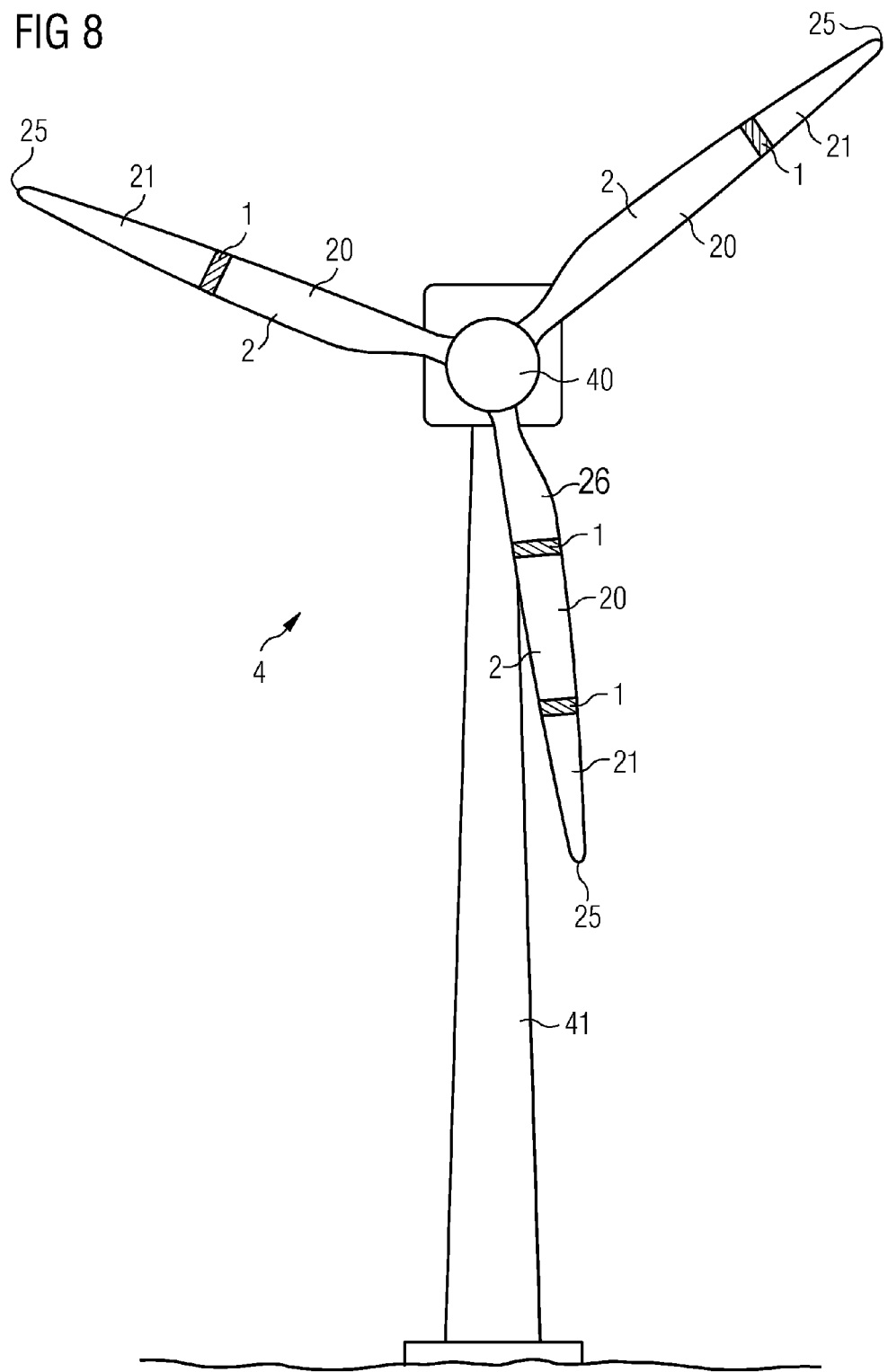
FIG. 8 shows a wind turbine according to an embodiment of the invention.

FIG. 8 shows a wind turbine 4, with three rotor blades 2. The diagrams shows possible embodiments for the rotor blades 2, each of which comprises blade sections 20, 21, 26 connected using the type of connector 1 described above. Here, one blade (on the left in the diagram) is shown with two blade sections of similar length; another blade (top right in the diagram) is shown with one long blade section 20 and a shorter tip blade section 21; the third blade (bottom right in the diagram) has three blade sections 20, 21, 26 of approximately equal length. In the case of the third blade, the blade section 20 in the centre might have the same type of connecting part at each end, or might have an inner connecting part at one end and an outer connecting part at the other end. The blade section 26 at the root end (closer to the hub 40) and the blade section 21 at the tip end would then have corresponding connecting parts. It should be noted that the diagram only shows some possibilities—usually the blades that are mounted to a wind turbine will all be the same.

For a wind turbine with rotor blades reaching or exceeding 100 m in length, the method according to the invention allows the manufacture of blade sections 20, 21, 26 that can be transported with relative ease to an assembly site. This may be the wind turbine site itself. For example, a first root blade section can be mounted to the hub 40 and brought into a vertical position. Assuming the blade sections are manufactured so that an inner connecting part extends in the direction of the blade tip, the inner connecting part will now face downwards. A further blade section can then be brought into place so that its outer connecting part faces upwards and encloses the inner connecting part of the first blade section. These can be glued together as explained above, using gravity to help distribute the adhesive in the mould between the inner and outer connecting parts. Alternatively, especially for rotor blades that have a curved profile, the blade sections can be joined before transporting the complete blade to the wind turbine site. To this end, blade sections can be mounted on trolleys or wagons that are guided along rails so that the blade sections can be pushed together in a controlled manner.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of constructing a wind turbine rotor blade, comprising:
    forming a first blade section to include an inner connecting part of a blade connector;
    forming a second blade section to include an outer connecting part of the blade connector such that the outer connecting part is adapted to enclose the inner connecting part;
    arranging a discrete first seal comprising compliant material to abut an end face of the inner connecting part;
    arranging the outer connecting part about the inner connecting part such that a mould is formed by an outer surface of the inner connecting part, an inner surface of the outer connecting part and the first seal; and
    introducing an adhesive layer to fill the mould;
    arranging the first blade section such that the inner connecting part points toward a tip of the blade;
    arranging the second blade section such that the outer connecting part points toward a base of the blade;
    abutting an end face of the inner connecting part with the first seal;
    hanging the blade with the tip oriented downward; and
    allowing gravity to assist with distribution of the adhesive layer in the mould;
    forming a second seal to trap the adhesive layer in the mould; and
    wherein the blade is secured to a hub of a wind turbine, the method further comprising rotating the hub and blade before the adhesive layer fully cures.

2. The method according to claim 1, further comprising monitoring a pressure between the inner connecting part and the first seal during the arranging of the outer connecting part about the inner connecting part.

3. The method according to claim 1, wherein introducing the adhesive layer to fill the mould comprises pouring an adhesive into a gap between the outer connecting part and the inner connecting part.

4. The method according to claim 1, further comprising applying the second seal at an interface between the blade sections.

* * * * *